(12) United States Patent
Rasmusson

(10) Patent No.: US 7,062,039 B1
(45) Date of Patent: Jun. 13, 2006

(54) METHODS AND APPARATUS FOR IMPROVING ADAPTIVE FILTER PERFORMANCE BY INCLUSION OF INAUDIBLE INFORMATION

(75) Inventor: Jim Rasmusson, Vellinge (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 694 days.

(21) Appl. No.: 09/320,659

(22) Filed: May 27, 1999

(51) Int. Cl.
H04B 3/23 (2006.01)

(52) U.S. Cl. .................... 379/406.1; 370/286

(58) Field of Classification Search ............ 379/406.1
See application file for complete search history.

(56) References Cited

U.S. PATENT DOCUMENTS

| | | | | |
|---|---|---|---|---|
| 4,621,173 A | * | 11/1986 | Guidoux | 379/406.1 |
| 4,969,144 A | | 11/1990 | Blackwell et al. | |
| 5,400,394 A | | 3/1995 | Raman et al. | |
| 5,859,907 A | * | 1/1999 | Kawahara et al. | 379/406.08 |

FOREIGN PATENT DOCUMENTS

| | | |
|---|---|---|
| EP | 0708536 A1 | 4/1996 |
| FR | 2762467 | 10/1998 |
| JP | 62-245850 | 10/1987 |
| JP | 63-312757 | 12/1988 |
| JP | 02-305155 | 12/1990 |
| JP | 05-244464 | 9/1993 |
| WO | WO98/03965 | 1/1998 |

OTHER PUBLICATIONS

N. Jayant, J. Johnston and R. Safranek, *Signal Compression Based on Models of Human Perception*, IEEE, vol. 81, No. 10, Oct. 1993.
K. Brandenburg, M. Bosi, *Overview of MPEG Audio: Current and Future Standards for Low–Bit–Rate Audio Coding*, J. Audio Eng. Soc., vol. 46, No. 1/2, 1987 Jan./Feb.
Steven E. Turner, "Passband Echo Cancellation Algorithms for High–Speed Modems," Proceedings of the Southeast Conference, U.S. New York, IEEE, 1991, pp. 856–860.

* cited by examiner

*Primary Examiner*—Daniel Swerdlow
(74) *Attorney, Agent, or Firm*—Potomac Patent Group PLLC

(57) ABSTRACT

Adaptive filtering algorithm training signals incorporate adaptation-enhancing signals having properties, such as spectral whiteness and rapidly decaying auto-correlation between samples, which allow the adaptive filtering algorithms to converge more quickly as compared to conventional algorithms. Exemplary adaptation-enhancing signals are incorporated such that the training signals are not perceptibly altered as compared to conventional training signals. For example, in a hands-free telephony application, an adaptation-enhancing signal according to the invention is dynamically tailored so that it is masked by a loudspeaker signal (the conventional training signal) and is thus inaudible to hands-free telephone users.

28 Claims, 2 Drawing Sheets

METHODS AND APPARATUS FOR IMPROVING ADAPTIVE FILTER PERFORMANCE BY INCLUSION OF INAUDIBLE INFORMATION

FIELD OF THE INVENTION

The present invention relates to communications systems, and more particularly, to adaptive filtering of audio signals in communications systems.

BACKGROUND OF THE INVENTION

Adaptive filtering arrangements are prevalent in communications systems of today. Such arrangements are typically used to reduce or remove unwanted signal components and/or to control or enhance wanted signal components.

A common example of such a filtering arrangement relates to hands-free telephony, wherein the built-in earphone and microphone of a conventional telephone handset are replaced with an external loudspeaker and an external microphone, respectively, so that the telephone user can converse without having to physically hold the telephone unit in hand. Since sound emanating from the external loudspeaker can be picked up by the external microphone, adaptive filtering is commonly performed in order to prevent the loudspeaker output from echoing back and annoying the far-end user at the other end of the conversation. This type of adaptive filtering, or echo canceling, has become a basic feature of the full-duplex, hands-free communications devices of today.

Typically, echo cancelation is achieved by passing the loudspeaker signal through an adaptive Finite Impulse Response (FIR) filter which approximates, or models, the acoustic echo path between the hands-free loudspeaker and the hands-free microphone (e.g., a passenger cabin in an automobile hands-free telephony application). The FIR filter thus provides an echo estimate which can be removed from the microphone output signal prior to transmission to the far-end user. The filtering characteristic (i.e., the set of FIR coefficients) of the adaptive FIR filter is dynamically and continuously adjusted, based on both the loudspeaker input and the echo-canceled microphone output, to provide a close approximation to the echo path and to track changes in the echo path (e.g., when a near-end user of an automobile hands-free telephone shifts position within the passenger cabin).

Adjustment of the filtering characteristic is commonly achieved using a form of the well known Least Mean Square (LMS) adaptation algorithm developed by Widrow and Hoff in 1960. The LMS algorithm is a least square stochastic gradient step method which, as it is both efficient and robust, is often used in many real-time applications. The LMS algorithm and its well known variations (e.g., the Normalized LMS, or NLMS algorithm) do have certain drawbacks, however. For example, the LMS algorithm can sometimes be slow to converge (i.e., approach the target filtering characteristic, such as the acoustic echo path in a hands-free telephony application), particularly when the algorithm is adapted, or trained, based on a non-white, or colored, input signal.

Slow LMS adaptation is a particular problem in the hands-free telephony context, inasmuch as the training signal (i.e., the loudspeaker signal) includes human speech which excites only a relatively small part of the total possible signal space and which has slowly decaying auto-correlation properties, particularly with respect to voiced (i.e., vowel) sounds. Moreover, near-end background noise (e.g., automobile cabin and road noise) can perturb and further slow the LMS adaptation process. Consequently, there is a need for improved adaptive filtering techniques, in the hands-free telephony and other contexts.

SUMMARY OF THE INVENTION

The present invention fulfills the above-described and other needs by providing fast-converging adaptive filtering algorithms. According to exemplary embodiments, the convergence speed of a conventional adaptive algorithm is improved by combining an adaptation-enhancing signal with the conventional algorithm training signal to provide an enhanced, or optimized, training signal. The adaptation-enhancing signal is chosen to have properties (e.g., spectral whiteness and rapidly decaying auto-correlation between samples) which allow the adaptation algorithm to converge more quickly. Advantageously, the adaptation-enhancing signal can be combined with the conventional training signal such that the enhanced training signal is not perceptibly different from the conventional training signal. For example, in the hands-free telephony context, the adaptation-enhancing signal can be tailored such that it is masked by the loudspeaker signal (i.e., the conventional training signal) and is thus inaudible to the telephone user.

An exemplary signal processing device according to the invention includes an adaptive filter configured to filter an input signal and to thereby provide a filtered output signal, a filtering characteristic of the adaptive filter being dynamically adjusted based upon the filtered output signal and upon a training signal. The exemplary signal processing device also includes an adaptation enhancement processor combining an adaptation-enhancing signal with a reference signal to provide the training signal, the adaptation-enhancing signal being dynamically adjusted based upon the reference signal. Advantageously, the adaptation-enhancing signal can be an inaudible component of the training signal which is masked by the reference signal. For example, the adaptation-enhancing signal can be generated by filtering a white pseudo-noise sequence or a reproducible maximum-length sequence using the frequency mask of the reference signal. Alternatively, the adaptation-enhancing signal can be generated by first audio encoding and then audio decoding the reference signal.

An exemplary method according to the invention includes the steps of computing a frequency mask of a reference signal, computing an adaptation-enhancing signal based on the frequency mask of the reference signal, computing a training signal based on the reference signal and the adaptation-enhancing signal, and adjusting a filtering characteristic of an adaptive filter based on the training signal. As above, the adaptation-enhancing signal can be an inaudible component of the training signal which is masked by the reference signal. For example, the step of computing the adaptation-enhancing signal can include the step of filtering a white pseudo-noise sequence or a maximum length sequence using the frequency mask of the reference signal. Alternatively, the step of computing the adaptation-enhancing signal can include the steps of audio encoding the reference signal and then audio decoding the reference signal.

The above-described and other features and advantages of the invention are explained in detail hereinafter with reference to the illustrative examples shown in the accompanying drawings. Those of skill in the art will appreciate that the described embodiments are provided for purposes of illus-

DETAILED DESCRIPTION OF THE INVENTION

Figure 1:
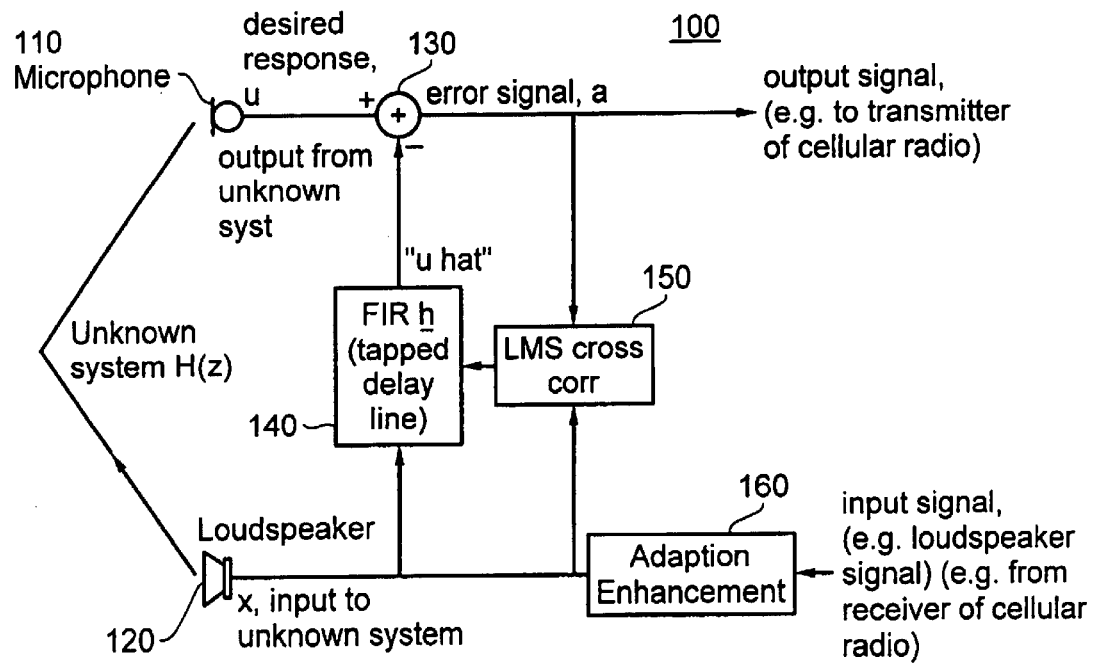
FIG. 1 is a block diagram of an exemplary hands-free telephony system in which adaptation-enhancing techniques of the invention are implemented.

FIG. 1 depicts an exemplary hands-free telephony system 100 incorporating adaptation-enhancement techniques according to the invention. As shown, the exemplary system 100 includes a microphone 110, a loudspeaker 120, a summing device 130, a Finite Impulse Response (FIR) filter 140, a Least Mean Square (LMS) cross correlator 150 and an adaptation-enhancement processor 160. Those of skill in the art will appreciate that the below described functionality of the components depicted in FIG. 1 can be implemented using known digital signal processing hardware and/or a general purpose digital computer. Those of skill in the art will also appreciate that, in practice, the exemplary system 100 includes components (e.g., an analog-to-digital converter at the output of the microphone 110 and a digital-to-analog converter at the input to the loudspeaker 120) which are omitted from FIG. 1, as they are not critical to an understanding of the present invention.

In operation, a far-end audio signal including speech of a far-end user (not shown) is input to the loudspeaker 120 for presentation to a near-end user (also not shown). The loudspeaker output is then echoed back to the microphone 110 via an unknown and sometimes changing echo path, as is indicated by a variable transfer function H(z) in FIG. 1. Thus, audio output from the microphone 110 includes loudspeaker echo, as well as near-end user speech and near-end background noise. To prevent the loudspeaker echo from reaching and annoying the far-end user, the FIR filter 140 filters the loudspeaker signal to provide an estimate of the loudspeaker echo received at the microphone 110, and the resulting echo estimate is subtracted from the microphone output via the summing device 130. Echo-canceled output from the summing device 130 is then transmitted to the far-end user and fed back to the LMS cross correlator 150 for use in adapting the filter coefficients, or taps, of the FIR filter 140 such that they converge toward and track the true echo path H(z). As is well known in the art, the LMS cross correlator 150 computes filter coefficient updates based on both the echo-canceled output, or error, signal and the loudspeaker input, or training, signal.

In conventional systems, the far-end audio signal is passed directly to the loudspeaker for presentation to the near-end user, and a digitized version of the far-end audio signal is used directly as the training, or reference, signal for developing the echo estimate (i.e., the digitized far-end audio is input directly to both the FIR filter 140 and the LMS cross correlator 150). Consequently, the filter coefficients of the FIR filter 140 can be slow to converge toward and track the true echo path H(z), as is described above. In other words, since the far-end user speech typically has slow-decaying auto-correlation properties and excites only a relatively small part of the overall possible signal space, the far-end audio signal is not ideal for use in training an LMS-based algorithm.

According to the present invention, however, the far-end audio signal is not used directly as a training signal for the LMS process. Rather, the adaptation-enhancement processor 160 uses the far-end audio signal as a reference in developing an adaptation-enhancing signal (i.e., a signal having properties more suited for training an adaptive algorithm) which is combined with the far-end audio reference signal to provide an optimal, adaptation-enhancing training signal. Advantageously, differences between the optimized training signal and the far-end audio reference signal (i.e., the conventional training signal) can be made imperceptible to the human ear. More specifically, the adaptation-enhancing signal can be tailored such that it is masked by the far-end audio signal and is thus inaudible to the near-end user. As a result, adaptation enhancement is achieved without affecting system performance from the near-end user perspective.

To make the adaptation-enhancing signal imperceptible to the near-end user listening to the far-end audio signal, well known masking properties of the human hearing mechanism are utilized. More specifically, a dynamic frequency mask of the far-end audio signal is computed in real time, and the adaptation-enhancing signal is dynamically adjusted in accordance with the frequency mask such that the adaptation-enhancing signal remains inaudible. In other words, the adaptation-enhancing signal is continually tailored so that it is effectively hidden by the far-end audio signal.

Figure 2:
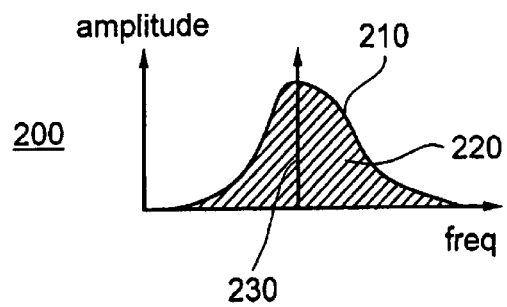
FIG. 2 is a spectral plot depicting an exemplary instantaneous frequency mask corresponding to a single audible tone.

Masking of one signal by another is depicted in FIG. 2. In the figure, an instantaneous frequency mask 210 of a single tone 230 is shown. The instantaneous frequency mask 210 defines an instantaneous region 220 which is masked (i.e., made inaudible) by the single tone 230. In other words, any signal having spectral content entirely within the region 220 cannot be detected by a human ear listening to the tone 230. In practice, the frequency mask of an audio signal is dynamic and continually changing, and those of skill in the art will appreciate that the instantaneous mask 210 applies only at a fixed moment in time.

The masking properties of the human hearing mechanism are described, for example, in Zwicker and Fastl, "Psychoacoustics, Facts and Models", Springer, Heidelberg, 1990. Additionally, algorithms for dynamically computing the frequency mask of an audio signal in real time are described in detail in specifications put forth by the well known Moving Pictures Experts Group (MPEG). See, for example, K. Brandenburg and Marini Bosi, "Overview of MPEG-Audio: Current and future standards for low bit-rate audio coding", 99th AES, New York, Oct. 6–9 1995, Preprint #4130 (29 pages), and Nikil Jayant, James Johnston and Robert Safranek, "Signal Compression Based on Models of Human Perception", Proceedings of the IEEE, October 1993, Volume 81, Number 10, pp. 1385–1421, each of which is incorporated herein by reference.

Such algorithms are used, for example, in MPEG audio coders to reduce the bit rate required to represent a signal of interest. In other words, the frequency mask algorithms are used to determine which portions of a signal can be removed without audibly distorting the signal. By way of contrast, dynamic frequency mask algorithms are used in the context of the present invention to establish the frequency distribution of the adaptation-enhancing signal. In other words, given the dynamic frequency mask of the far-end audio signal, the adaptation-enhancing signal is constructed in real time so that it has spectral content lying entirely within the inaudible region (i.e., within the region masked by the far-end audio signal). For example, the adaptation-enhancing signal can be adjusted to have a spectral distribution approximating that of the dynamically computed frequency mask.

Generation of the adaptation-enhancing signal in accordance with the frequency mask of the far-end audio signal can be accomplished in a number of ways. For example, a model signal having properties which promote rapid adaptive algorithm convergence (e.g., spectral whiteness and rapidly decaying or non-existent autocorrelation between samples) can be filtered using the far-end audio frequency mask to provide the adaptation-enhancing signal.

Exemplary model signals include white psuedo noise (PN) signals and reproducible maximum length sequence (MLS) signals. Methods for generating such signals in real time are well known. White noise and MLS signals are often used, for example, in real-time testing of frequency and room responses for hi-fidelity audio equipment. Advantageously, when the resulting adaptation-enhancing signal is combined with (e.g., added to) the far-end audio signal, the resulting optimized training signal causes the filtering characteristic of the FIR filter 140 to converge more quickly, while the near-end user remains unaware that the adaptation-enhancing signal is present.

Figure 3:
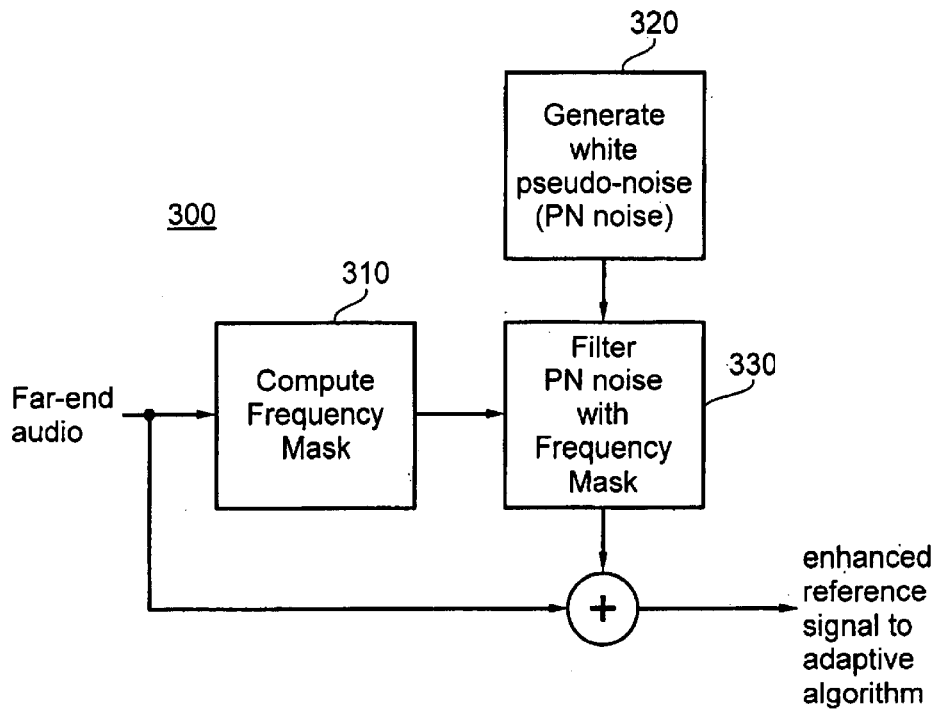
FIG. 3 is a block diagram of an exemplary adaptation-enhancement processor according to the invention.

FIG. 3 depicts an exemplary processor 300 for generating an enhanced adaptive algorithm training signal in the above described fashion. The exemplary processor 300 can be used, for example, to implement the adaptation enhancement processor 160 of FIG. 1. As shown, the exemplary processor 300 includes a frequency mask computation processor 310, a pseudo-noise generator 320, a frequency mask filter 330, and a summing device 340. Those of skill in the art will appreciate that the below described functionality of the components of FIG. 3 can be implemented using any of a variety of known hardware configurations, including standard digital signal processing components, a general purpose digital computer, and/or one or more application specific integrated circuits (ASICs).

In FIG. 3, a reference signal (e.g., a far-end audio signal) is coupled to an input of the frequency mask computation processor 310 and to a first additive input of the summing device 340. Additionally, an output of the frequency mask computation processor 310 is coupled to a control input of the frequency mask filter 330, and an output of the pseudo noise generator 320 is coupled to an audio input of the frequency mask filter 330. Further, an audio output of the frequency mask filter 330 is coupled to a second additive input of the summing device 340, and an output of the summing device 330 serves as the adaptation-enhancing training signal (e.g., for input to the adaptive filter 140 and the LMS cross correlator 150 of FIG. 1).

In operation, the frequency mask computation processor 310 computes the dynamic frequency mask of the far-end audio signal (e.g., once every block of samples of the far-end audio signal). As described above, the frequency mask is computed using any suitable algorithm such as the algorithms described in the above incorporated MPEG documents. The resulting frequency mask is then used to update the filter transfer function of the frequency mask filter 330. At the same time, the generator 320 provides a model signal (e.g., a pseudo white noise sequence or a maximum length sequence) to the audio input of the frequency mask filter 330, and the filter 330 processes the model signal to provide a filtered modeled signal which is added to the far-end audio signal (via the summing device 340) to provide the enhanced adaptive algorithm reference signal. As described above, the added signal content promotes rapid convergence of the echo-canceling adaptive filter (e.g., filter 130 of FIG. 1) and is inaudible to the near-end user.

Those of skill in the art will appreciate that the filtering performed by the frequency mask filter 330 can be carried out in either the frequency or the time domain. In applications where frequency-domain filtering (i.e., filtering by vector-multiplication of a set of frequency-domain coefficients of the filter 330 with a frequency-domain representation of a block of samples of the model signal) is preferable, the filter 330 can be updated by periodically (e.g., once every sample block) copying the spectral values resulting from the frequency mask computation directly to the filter 330. Alternatively, in applications where time-domain filtering (i.e., filtering by sample-wise convolution of samples of the model signal with time-domain coefficients of the frequency mask filter 330) is preferable, the filter 330 can be updated by converting the spectral values resulting from the frequency mask computation to the time domain (e.g., using an Inverse Fast Fourier Transform, or IFFT) and then copying the resulting time-domain coefficients to the filter 300. Selection between time-domain and frequency-domain filtering is a matter of design choice.

Figure 4:
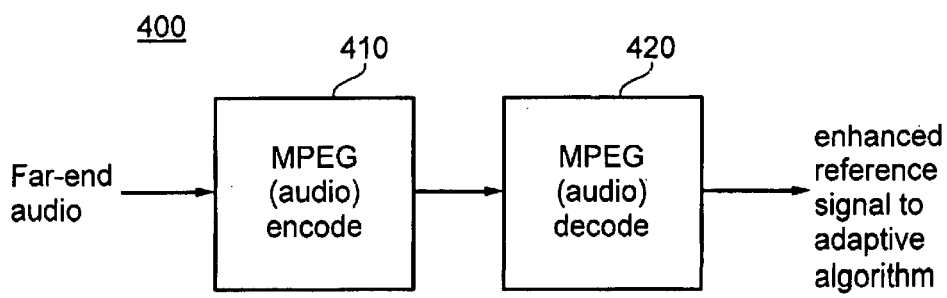
FIG. 4 is a block diagram of an alternative adaptation-enhancement processor according to the invention.

FIG. 4 depicts an alternative system 400 for generating the adaptation-enhancing signal in accordance with the frequency mask of the far-end audio signal. Like the processor 300 of FIG. 3, the alternative processor 400 can be used, for example, to implement the adaptation enhancement processor 160 of FIG. 1. As shown, the alternative processor 400 includes an MPEG audio encoder 410 and an MPEG audio decoder 420. Those of skill in the art will appreciate that the below described functionality of the components of FIG. 4 can be implemented using any of a variety of known hardware configurations, including standard digital signal processing components, a general purpose digital computer, and/or one or more application specific integrated circuits (ASICs).

In FIG. 4, a reference signal (e.g., the far-end audio signal) is coupled to an input of the audio encoder 410, and an output of the audio encoder 410 is coupled to an input of the audio decoder 420. An output of the audio decoder 420 serves as the adaptation-enhancing training signal (e.g., for input to the adaptive filter 140 and the LMS cross correlator 150 of FIG. 1).

In operation, the audio encoder 410 encodes the far-end audio signal (e.g., using an MPEG encoding algorithm as described in the above incorporated MPEG documents), and the audio decoder 420 immediately decodes the resulting signal (e.g., using a complementary MPEG decoding algorithm as described in the above incorporated MPEG articles) to provide the adaptation-enhancing reference signal. Since the MPEG audio coder encodes inaudible information in the far-end audio signal using very few bits, the inaudible information is heavily quantized, and inaudible quantization noise is introduced as desired. As with the processor 300 of FIG. 3, the signal content introduced into the far-end audio signal in FIG. 4 promotes rapid convergence of the echo-canceling adaptive filter (e.g., filter 130 of FIG. 1) and is inaudible to the near-end user.

Generally, the present invention provides methods and apparatus for improving the convergence speed of an adaptive filtering algorithm. According to exemplary embodiments, the convergence speed of an adaptive algorithm is improved by combining an adaptation-enhancing signal with the conventional algorithm training signal to provide an enhanced, or optimized, training signal. The adaptation-enhancing signal is constructed having properties (e.g., spectral whiteness and rapidly decaying auto-correlation between samples) which allow the adaptation algorithm to converge more quickly. Advantageously, the adaptation-enhancing signal can be combined with the conventional training signal such that the enhanced training signal is not perceptibly different from the conventional training signal. For example, in the hands-free telephony context, the adaptation-enhancing signal can be tailored such that it is masked by the loudspeaker signal (i.e., the conventional training signal) and is thus inaudible to the telephone user.

Those skilled in the art will appreciate that the present invention is not limited to the specific exemplary embodiments which have been described herein for purposes of illustration and that numerous alternative embodiments are also contemplated. For example, although the exemplary embodiments have been described with respect to acoustic echo cancelation in the hands-free telephony context, the disclosed adaptation-enhancement techniques are equally applicable to all adaptive filtering arrangements (e.g., adaptive noise suppression and network echo cancelation). Moreover, the disclosed masking techniques can also be used, for example, to transfer inaudible data behind an audible signal of interest, such as speech or music. The scope of the invention is therefore defined by the claims appended hereto, rather than the foregoing description, and all equivalents consistent with the meaning of the claims are intended to be embraced therein.

What is claimed is:

1. A signal processing device, comprising:
an adaptive filter configured to filter an input signal and to thereby provide a filtered output signal, wherein a filtering characteristic of said adaptive filter is dynamically adjusted based upon the filtered output signal and upon a training signal; and
an adaptation enhancement processor combining an adaptation-enhancing signal with a reference signal to provide the training signal to said adaptive filter, the adaptation-enhancing signal being dynamically adjusted based upon the reference signal.

2. A signal processing device according to claim 1, wherein the input signal is a near-end audio signal and the reference signal is a far-end audio signal.

3. A signal processing device according to claim 1, wherein said adaptive filter is an echo-canceling filter and wherein the filtered output signal is a near-end echo-canceled audio signal.

4. A signal processing device according to claim 1, wherein said adaptation enhancement processor adds the adaptation-enhancing signal to the reference signal to provide the training signal for said adaptive filter.

5. A signal processing device according to claim 1, wherein the adaptation-enhancing signal is generated based on a dynamically computed frequency mask of the reference signal.

6. A signal processing device according to claim 1, wherein the adaptation-enhancing signal is an inaudible component of the training signal which is masked by the reference signal.

7. A signal processing device according to claim 6, wherein a frequency distribution of the adaptation-enhancing signal approximately matches the frequency mask of the reference signal.

8. A signal processing device according to claim 6, wherein the adaptation-enhancing signal is generated by filtering a white pseudo-noise sequence using the frequency mask of the reference signal.

9. A signal processing device according to claim 6, wherein the adaptation-enhancing signal is generated by filtering a reproducible maximum-length sequence using the frequency mask of the reference signal.

10. A signal processing device according to claim 6, wherein the adaptation-enhancing signal is generated by first audio encoding and then audio decoding the reference signal.

11. A signal processing device according to claim 1, wherein the filtering characteristic of said adaptive filter is adjusted according to a Least Mean Square (LMS) algorithm.

12. A communications device for providing bi-directional communications between a near-end user and a far-end user via a bi-directional communications channel, comprising:
a near-end microphone receiving near-end sound and providing a corresponding near-end audio signal;
an adaptive echo canceler receiving the near-end audio signal and providing an echo-canceled near-end signal for transmission to the far-end user via the communications channel, wherein adaptive filtering coefficients of said adaptive echo canceler are adjusted dynamically in dependence upon the echo-canceled near-end signal and upon an audio training signal;
an adaptation-enhancement processor receiving a far-end audio signal via the communications channel and providing the audio training signal to said adaptive filter, wherein said processor dynamically computes the audio training signal by combining the far-end audio signal with an adaptation-enhancing signal, the adaptation-enhancing signal being dynamically adjusted based upon a frequency mask of the far-end audio signal; and
a near-end loudspeaker receiving the audio training signal and providing corresponding far-end sound to the near-end user.

13. A communications device according to claim 12, wherein said processor dynamically computes the audio training signal by summing samples of the far-end audio signal and the adaptation-enhancing signal.

14. A communications device according to claim 12, wherein the adaptation-enhancing signal is an inaudible component of the audio training signal.

15. A communications device according to claim 14, wherein the adaptation-enhancing signal is adjusted so that a frequency distribution of the adaptation-enhancing signal approximately tracks the frequency mask of the far-end audio signal.

16. A communications device according to claim 14, wherein the adaptation-enhancing signal is produced by filtering a white pseudo-noise sequence using the frequency mask of the far-end audio signal.

17. A communications device according to claim 14, wherein the adaptation-enhancing signal is produced by filtering a reproducible maximum length sequence using the frequency mask of the far-end audio signal.

18. A communications device according to claim 14, wherein the adaptation-enhancing signal is produced by first audio encoding and then audio decoding the far-end audio signal.

19. A communications device according to claim 12, wherein the adaptive filtering coefficients of said adaptive echo canceler are adjusted according to a Least Mean Squares (LMS) algorithm.

20. A method for training an adaptive filter, comprising the steps of:

computing a frequency mask of a reference signal;

computing an adaptation-enhancing signal based on the frequency mask of the reference signal;

computing a training signal based on the reference signal and the adaptation-enhancing signal; and adjusting a filtering characteristic of the adaptive filter based on the training signal.

21. A method according to claim 20, wherein the adaptive filter is an echo-canceling filter and wherein the reference signal is an audio signal.

22. A method according to claim 20, wherein said step of computing a training signal comprises the step of adding the adaptation-enhancing signal to the reference signal.

23. A method according to claim 20, wherein the adaptation-enhancing signal is an inaudible component of the training signal which is masked by the reference signal.

24. A method according to claim 23, wherein said step of computing an adaptation-enhancing signal comprises the step of causing a frequency distribution of the adaptation-enhancing signal to approximate the computed frequency mask.

25. A method according to claim 23, wherein the adaptation-enhancing signal is produced by filtering a white pseudo-noise sequence using the frequency mask of the reference signal.

26. A method according to claim 23, wherein the adaptation-enhancing signal is produced by filtering a reproducible maximum length sequence using the frequency mask of the reference signal.

27. A method according to claim 23, wherein the adaptation-enhancing signal is produced by first audio encoding and then audio decoding the reference signal.

28. A method according to claim 20, wherein the frequency characteristic of the adaptive filter is adjusted in accordance with a Least Mean Square (LMS) algorithm.

* * * * *